Patented Nov. 9, 1943

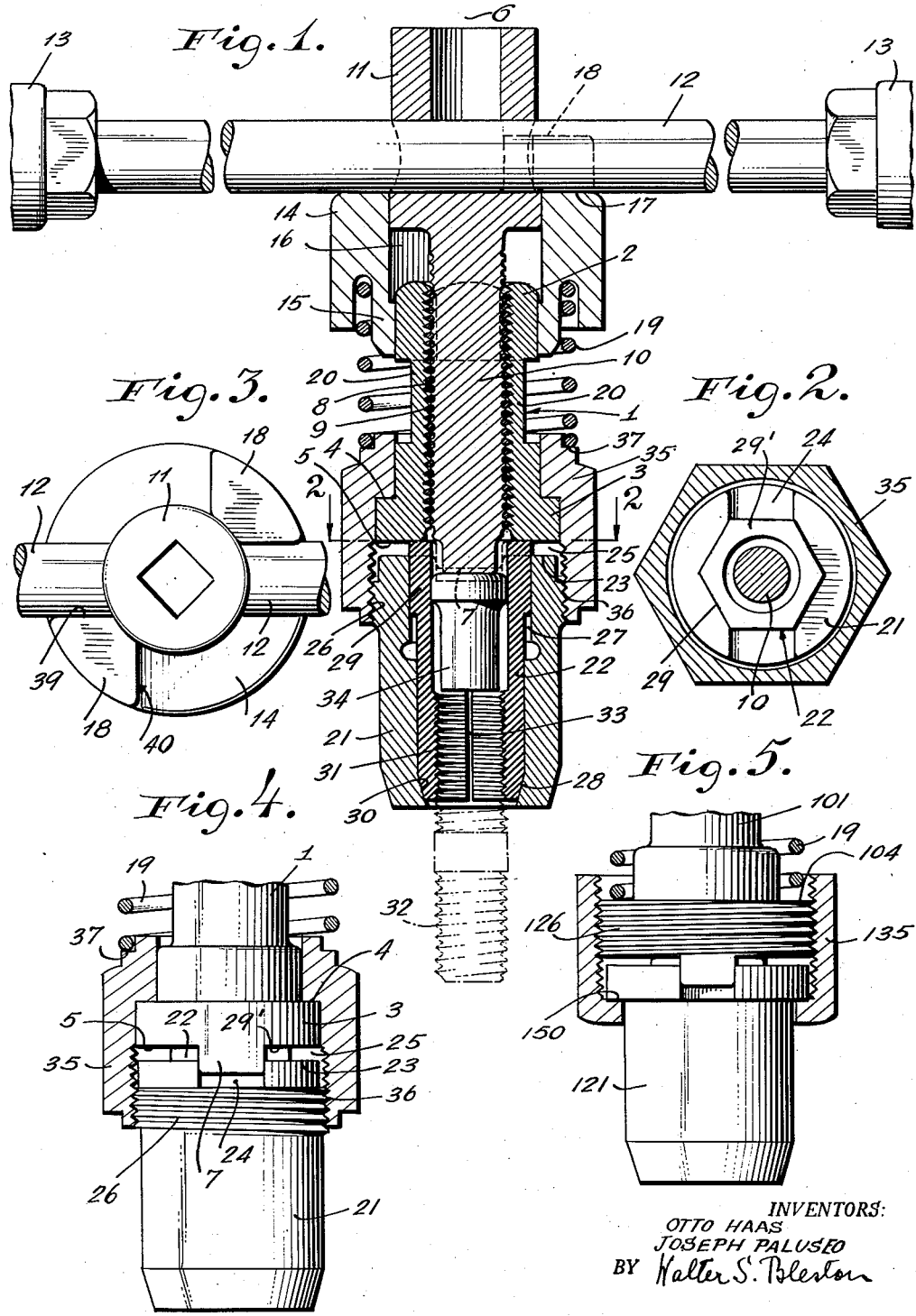

2,334,088

UNITED STATES PATENT OFFICE 2,334,088

STUD DRIVER AND EXTRACTOR

Otto Haas, Richmond Hill, and Joseph Paluseo, Astoria, N. Y., assignors to Aircraft Screw Products Company, Incorporated, Long Island City, N. Y., a corporation of New York Application August 13, 1942, Serial No. 454,718

5 Claims. (Cl. 81—113)

The present invention relates to a stud driver and extractor, and more particularly to a tool wherein a screw threaded shaft can be operated so as to cause an axial shift of a chuck or collet in engagement with a stud, relatively to an inclined face of another part of the tool, in order to effect a contraction and tight grip of said chuck, during the setting of the stud. Such tools of the conventional type are satisfactory as stud drivers. However, they have been found to be unsatisfactory when used in order to extract a firmly set stud. The reason for such different efficiency of the tool seems to be due to the fact that a much greater torque is required to remove a stud from its boss than to drive it in, probably because the microscopically small projections of the thread surfaces of the stud and boss come, by and by, into more intimate engagement owing to vibrations, etc., to which the connection is subjected. Furthermore, in general, the direction of rotation of the shaft for tightening the grip of the chuck, is the same as the direction of rotation of the entire tool for inserting the gripped stud in a boss. If now, the rotation is reversed in order to extract the stud, it may happen that also a reversal of the shaft rotation occurs with the effect that the chuck grip is released rather than tightened.

The present invention contemplates to avoid these drawbacks and to provide a tool which is equally well suited both as a stud driver and a stud extractor. The invention consists in the combination of means whereby the tightness of the grip of the chuck on a stud can be increased for extraction beyond the degree of tightness required for inserting the stud. The invention further consists in means whereby the grip of the chuck can be tightened by turning a member in the direction of rotation of the torque applied for extracting the stud.

Further details and objects of the invention will be apparent from the description given hereinafter of an embodiment illustrated in the accompanying drawing by way of example.

In the drawing,

Fig. 1 is a longitudinal cross-section of a tool according to the invention,

Fig. 2 is a cross-section along line 2—2 of Fig. 1,

Fig. 3 is a top plan view of the tool illustrated in Fig. 1,

Fig. 4 is a side elevation of the lower portion thereof, partly in section, and

Fig. 5 is an elevation similar to Fig. 4 of a modification.

The drawing shows the invention applied to a tool of the type described in U. S. Patent 2,257,089 granted to Camincz, September 30, 1941. However, it is to be understood that this type is selected as an example only in disclosing our invention which is applicable also to other type tools of the kind here in consideration. The tool according to Fig. 1 comprises a substantially cylindrical body 1 whose upper portion 2 has a polygonal circumference, a hexagon being shown in the present case. For a purpose to be explained later, the lower portion 3 of the body 1 forms an annular shoulder 4 and has a plane bottom surface 5 at right angles to the body axis 6. One or a plurality of lugs 7 extend downward from the face 5. The body 1 is provided with an internal screw threading, which may be of any suitable and conventional type to withstand an appreciable axial force, a so-called Aero-Thread connection being shown in which a wire coil insert 9 is applied to the thread groove tapped in the body 1. A screw threaded shaft 10 is in engagement with the threading of body 1 either directly or, if the insert 9 is present, indirectly by the intermediary of the latter. Shaft 10 has a head 11 through which a cross bar or rod 12 provided with handles 13 is passed so that an appreciable torque can be applied to the shaft 10. A substantially tubular member 14 has in its lower portion 15 an inner polygonal cross-section according to the circumference of the portion 2 of body 1, whereas the upper portion 16 of its interior is slightly wider than the circumscribed circle of the polygon at 15. From the top surface 17 of member 14 at least one lug 18 projects somewhat higher than half the thickness of rod 12 when the latter bears on the surface 17. A spring 19 is so arranged as to urge the member 14 upward in the illustrated position in which simultaneously surface 17 is in engagement with rod 12 and the portion 15 is in engagement with the body portion 2. However, it will be clear from the drawing and the foregoing description, that member 14 can be pulled downward against the restraint of spring 19 so that the portion 15 is opposite a reduced portion 20 of body 1. When, then, the member 14 is slightly turned in relation to body 1, the two mentioned polygonal faces will come out of registry so that member 14 is prevented from being shifted upward until registry of the polygonal faces is restored.

A holder 21 is provided to receive therein a chuck or collet 22. Means are provided to connect the holder 21 with the body 1 for common rotation to allow, however, for a limited axial movement of the holder in relation to the body. For this purpose, top surface 23 of the substantially tubular holder has recesses 24 in engagement with the lugs 7 of body 1, so, however, that a gap 25 of variable width exists between the surfaces 23 and 5, and between the bottom faces of the lugs 7 and those of the recesses 24. The upper portion of the holder 21 is provided with an outer screw threading 26 and with an inner plane faced cross-section 27 of e. g. hexagonal shape. The lower end of the holder is interiorly cone shaped or downwardly tapered, as shown at 28. The chuck or collet 22 fits into the holder 21. It is also substantially tubular and engages the hexagonal portion 27 with its upper portion 29, and the taper 28 of the holder with its lower conical portion 30. The chuck is provided with an inner threading 31 according to the threading of a stud 32 for which the tool is destined, and with longitudinal slots 33 owing to which the chuck can be contracted or compressed in order to grip tightly a stud 32 screwed into the threading 31. A pin 34 of suitable length may be inserted between the lower end of shaft 10 and the stud 32 in order to adapt the tool for studs of various lengths and also in order to insure that friction owing to relative rotation occurs between the shaft and the pin rather than between the shaft and the stud gripped by the chuck. It will be noted that in the position illustrated in Fig. 1, in which the chuck is not compressed, the top of the chuck projects from the top of the holder, so as to bear with its top face 29' against the face 5 of body 1, and that the inner hexagonal portion 27 of the holder extends below the chuck portion 29 a distance similar to the width of the gap 25.

Means are provided to urge the holder 21 upward, i. e. to decrease the gap 25 in order to compress the lower chuck portion owing to the effect of the conical faces 28. For this purpose, a nut 35 is slipped from the top over the body 1 and rests with an inner shoulder rotatable on the aforementioned shoulder 4 of the body 1. The inner threading 36 of the nut is in engagement with the threading 26 of the holder 21. In the illustrated embodiment the top of the nut is provided with an off-set rim 37 which serves as a supporting surface for the spring 19. The nut includes means whereby a torque may be applied thereto relatively to the body 1. Such means may consist of a lateral arm as constituted by the rod 12 in relation to shaft 10. It is preferred, however, to give the unit an exterior shape such as a hexagonal cross-section to which a wrench may be applied and which is shown in Fig. 2, because a permanently connected arm may interfere with parts of an extraneous structure.

The tool can be used in the following manner: Driving of a stud is accomplished the same as described in the above mentioned Patent 2,257,089, that is to say, first the member 14 is shifted downward and turned so that it stays in retracted position. Then, the shaft 10 is turned in relation to body 1 until the lower face of pin 34 when bearing against the shaft is at a distance from the lower tool end substantially equal to that length of the stud which is intended to be gripped by the chuck. Thereafter, the member 14 will be released by turning it into such registry of the polygonal faces of the member and the body, that one of the lugs 18 is as closely as possible in the rear of rod 12 when the member 14 is projected as in Fig. 1. In order to complete the setting of the tool, the holder 21 is preferably brought into such a position by turning nut 35 the one way or other that the top face 29' of the chuck abuts against the body face 5, whereas the top face 23 of the holder is spaced from the face 5 sufficiently to avoid a wedging effect of the cone face 28 on the chuck.

Now, the stud to be driven can be either first screwed into the chuck of the tool and, then, together with the latter, applied to the tapped hole of the boss into which the stud is to be driven, or preferably, the stud is first slightly screwed by hand into the tapped hole and then the tool applied to the projecting end of the boss. In any event, the chuck is screwed on the stud, while the chuck is open. When the top of the stud contacts the bottom face of pin 34 further screwing will cause an axial pressure reaction tending to shift the chuck 22 downward in relation to the holder 21 whereby the chuck will be contracted to grip the stud tightly owing to the effect of the conical faces at 28. If the tool is adjusted as hereinbefore described, the rotation of the shaft relatively to the body 1 is limited by the lugs 18 to the angle of possible rotation of rod 12 about axis 6 between the front face 39 of the one lug 18 and the rear face 40 of the other lug, front and rear to be understood according to the direction of rotation. This angle, the pitch of the shaft threading 8, and the conicality at 28 can be so selected that any reasonable gripping force can be exercised by the chuck on the stud. When the torque applied to the shaft 10 has reached a certain quantity, the grip on the stud will be so strong, that the stud will be taken along against the resistance of its friction in the tapped hole and will be driven into the latter. It will be noticed that the tool has self-adjusting properties as to the axial force acting through the shaft threading; and as to the gripping force of the chuck, both increasing and decreasing with the resistance of the stud to the driving.

Now, it will be clear that such self-adjusting property does not exist in the described manner, if the torque applied at the handles of the rod 12 is reversed in order to extract a stud.

Assuming the user would try to do so, he would first screw down shaft 10 on the stud to which the chuck is applied, while member 14 is in retracted position, whereby the chuck will be caused to grip the stud tightly as hereinbefore described. The shaft 10 must be finally in such a position that rod 12 comes to bear against the front face 39 of one of the lugs 18, so that upon reversal of the torque the entire assembly including the stud is taken along. An extreme force must be applied in screwing down the shaft because the axial pressure must be sufficient even if an unavoidable relative slip occurs between the shaft and the body 1 upon reversal of the torque, and also because of the much greater force required for extracting the stud than for driving it as hereinbefore stated. This extreme axial force may easily become detrimental to the threading of shaft and body. Such happening is avoided by the described structure of the improved tool according to the invention.

The operation of this tool in extracting a stud is as follows: The shaft is set as hereinbefore described, that means, in the same manner as in using the tool for driving a stud. Then the tool is screwed with the chuck onto the stud to be extracted. This is done without exercising material axial pressure so that the chuck surface 29' stays in contact with the surface 5 of body 1. Then a wrench will be applied to the nut 35 and torque applied thereto in such a sense that the holder 21 is shifted upward in relation to the chuck 22. Owing to this relative movement and the conical faces 28 the chuck will be contracted to exercise a tight grip on the stud. Even under an extreme gripping force the shaft threading cannot be injured because any axial pressure resulting therefrom is directly transmitted from the chuck to the body owing to the engagement of the faces 29' and 5. On the other hand, the thread of the nut 34 is not endangered because it is of much larger diameter than that of the shaft and therefore suited to take up a much higher load at an admissible pressure per area. Should by incorrect adjustment it happen that pressure is exercised through the stud and the shaft on the shaft threading so that the chuck is shifted out of engagement with the surface 5, overstressing of the thread 8 of the shaft will still be avoided because no relative movement occurs between the shaft and the body when nut 35 is operated to shift the holder 21 upward in relation to the chuck 22. When a sufficiently tight grip is obtained on the stud, torque to extract the stud may be applied at the handles of the rod 12. The flux of the force is then from rod 12 through lug 18, member 14, body 1, lug 7, chuck holder 21, top 29 of chuck 21, and through the threaded portion 31 of the latter, owing to the friction set up, to the stud 32.

If a stud is extracted in the manner just described it is necessary to apply a counter-torque at the rod 12 during the tightening of the nut 35 because, otherwise there might be the tendency of driving the stud in rather than extracting it. This is true if the direction of the threading of the nut 35 is the same as that of the stud, for instance, right-handed. For this reason, it is advisable to use a threading of opposite direction, in the nut 35 and the associated chuck holder 21, whereas the direction of the shaft threading is the same as that of the stud for which the tool is destined. This means that if the direction of the threading of the stud is right-handed the threading of the shaft should be right-handed too, and that of the nut should preferably be left-handed. In that event, it is recommended to use the tool in the following manner: First, the member 14 is retracted and the shaft is so turned that the chuck can be screwed a desired distance on the chuck, without urging the chuck out of engagement wtih the body surface 5. The so adjusted position should be one in which the rod 12 bears against the rear face 40 of one of the lugs 18, when member 14 is projected. Nut 35 will be so set that the chuck is not contracted and that the gap 25 is sufficiently wide to allow for the required movement of the holder 21 to contract the chuck. Then, the tool may be applied to the stud to be extracted by rotating the tool with the aid of the rod 12 in clockwise direction until the top of the stud contacts the pin 34 without pressure. Thereafter, a wrench may be applied to nut 35 and turned in an anti-clockwise direction while holding rod 12 until the friction between stud and chuck is such that continued turning of nut 35 further tightens the grip rather than causes the chuck from being screwed off the stud. When the torque applied to the nut 35 in this manner has reached a certain quantity the forces will so be in equilibrium, that a further increase of the torque will turn the stud i. e. extract the stud, rather than increase the tightness of the grip of the chuck. Thus the tool has a self-adjusting property when extracting studs, similar to that when driving studs as hereinbefore described. In other words, the axial force occurring in the threading of the nut will never be greater than required to extract a stud in each particular case. It is, of course, also possible to extract a stud by turning the tool with the aid of rod 12 after the chuck has been sufficiently tightened by means of nut 35. In that event, a rotation of the shaft relatively to the body 1 will first occur until rod 12 has come into engagement with a front face 39 of a lug, and only thereafter will the tool follow the turning of the shaft. However, it will be noticed that such relative rotation will raise the shaft with respect to the body 1 so that no axial force is caused thereby in the shaft threading.

If for any reasons, it is deemed advisable to provide the tool only with threadings of the same sense, a similar effect to that just described can be obtained by a modification such as shown in Fig. 5. This modified embodiment differs from that of Figs. 1 to 4 merely in that the nut 135 is reversed in its position as compared with nut 35. That means, the inner shoulder 150 of the nut 135 bears from below against a shoulder or step of the chuck holder 121, and the right-handed threading of the nut engages an exterior threading 126 of the body 101. In that event, spring 19 may rest with its lower end on a shoulder 104 of the body 101. In all other respects, the embodiment of Fig. 5 is similar to that illustrated in Figs. 1 to 4. It will be clear that in the modified tool a left-handed torque, seen from the top, is required to tighten the chuck, the same as in the case of the left-handed nut 35 of the first described embodiment.

It will be understood that various changes in the specific form of our novel tool may be made without departing from our invention which is not limited by the particular disclosure of the embodiments thereof illustrated and described hereinabove but by the scope of the appended claims.

We claim:

1. A stud driver and extractor comprising an interiorly screw threaded body, a screw threaded shaft in engagement therewith, a chuck holder connected to said body coaxially therewith and permanently spaced a variable distance from the lower end of said body, a chuck in said holder, said chuck being axially movable in relation to said shaft and said holder and connected with the latter for common rotation, downwardly tapering conical faces of said chuck and said holder in engagement with each other, the lower end of said shaft constituting an axially shiftable abutment to limit the distance a stud may enter said chuck, and said shaft embodying a means for setting up an axial force on said stud seated in said chuck in abutting position, thereby to shift said chuck downward in relation to said holder and said body, said chuck projecting upwardly beyond the upper end of said holder to contact said body and means in engagement with said body and said holder to shift the latter upward in relation to said chuck and said body.

2. A stud driver and extractor comprising an interiorly screw threaded body, a screw threaded shaft in engagement therewith, a chuck holder connected to said body coaxially therewith and permanently spaced a variable distance from the lower end of said body, a chuck in said holder, said chuck being axially movable in relation to said shaft and said holder and connected with the latter for common rotation, downwardly tapering conical faces of said chuck and said holder in engagement with each other, the lower end of said shaft constituting an axially shiftable abutment to limit the distance a stud may enter said chuck, and said shaft embodying a means for setting up an axial force on said stud seated in said chuck in abutting position, thereby to shift said chuck downward in relation to said holder and said body, said chuck projecting upwardly beyond the upper end of said holder to contact said body and a nut in engagement with said body and said holder as a means for varying the spacing of said holder from said body.

3. In a tool of the type described the combination of a body having a lower surface, a chuck holder in axial continuation of said body and spaced from said surface, a slotted chuck interiorly of and upwardly projecting from said holder and having an upper surface adapted to abut against said lower body surface, said body, said holder and said chuck being connected for common rotation, downwardly tapering faces of said holder and said chuck in engagement with each other, means in engagement with said body and adapted to engage a stud seated in said chuck for setting up an axial force to move said chuck downwardly in relation to said holder and said body, and means to move said holder upward in relation to said body and said chuck when the latter abuts against the former whereby either relative movement will cause the chuck to contract owing to the effect of said tapering faces.

4. A stud driver and extractor comprising an interiorly screw threaded body, said body having a lower surface and an annular shoulder, a screw threaded shaft in engagement with said body, an exteriorly screw threaded chuck holder in axial continuation of said body and spaced from said surface, an interiorly screw threaded, slotted chuck interiorly of and upwardly projecting from said holder and having an upper surface adapted to abut against said lower body surface, said holder and said chuck being connected for common rotation to said body and axially movable in relation thereto and to each other, and having downwardly tapering faces in engagement with each other, the lower end of said shaft constituting an axially shiftable abutment to limit the distance a stud may enter said chuck, and said shaft embodying a means for setting up an axial force on said stud seated in said chuck in abutting position, thereby to shift said chuck downward in relation to said holder and said body, and a cap nut rotatable on said body shoulder and in engagement with said holder threading to vary the spacing of said holder from said body surface, the direction of the screw threading of said chuck and of said shaft being the same as that of a stud for which the tool is destined, and said nut is threaded in the opposite direction.

5. A stud driver and extractor comprising an interiorly screw threaded body having a lower surface and an exterior threading, a screw threaded shaft in engagement with said interior threading, a chuck holder in axial continuation of said body and spaced from said surface, said holder having an external annular shoulder, an interiorly screw threaded slotted chuck interiorly of and upwardly projecting from said holder and having an upper surface adapted to abut against said lower body surface, said holder and said chuck being connected for common rotation, to said body and axially movable in relation thereto and to each other, and having downwardly tapering faces in engagement with each other, the lower end of said shaft constituting an axially shiftable abutment to limit the distance a stud may enter said chuck, and said shaft embodying a means for setting up an axial force on said stud seated in said chuck in abutting position, thereby to shift said chuck downward in relation to said holder and said body, and a cap nut rotatable on said shoulder and in engagement with said exterior threading of said body to vary the spacing of said holder from said body surface, all said threadings being of the same direction.

OTTO HAAS.
JOSEPH PALUSEO.